(12) United States Patent
Dobrowolski et al.

(10) Patent No.: US 9,981,646 B2
(45) Date of Patent: May 29, 2018

(54) BRAKE CYLINDER

(71) Applicant: WABCO Europe BVBA, Brussels (BE)

(72) Inventors: Bartosz Dobrowolski, Wroclaw (PL);
Oktawian Szuberski, Wroclaw (PL)

(73) Assignee: WABCO Europe BVBA, Brussels (BE)

( * ) Notice: Subject to any disclaimer, the term of this patent is extended or adjusted under 35 U.S.C. 154(b) by 12 days.

(21) Appl. No.: 15/105,577

(22) PCT Filed: Dec. 19, 2013

(86) PCT No.: PCT/EP2013/003875
§ 371 (c)(1),
(2) Date: Jun. 17, 2016

(87) PCT Pub. No.: WO2015/090344
PCT Pub. Date: Jun. 25, 2015

(65) Prior Publication Data
US 2016/0332613 A1    Nov. 17, 2016

(51) Int. Cl.
*B60T 17/08* (2006.01)
*F16D 65/00* (2006.01)
*B60T 13/38* (2006.01)

(52) U.S. Cl.
CPC ............ *B60T 17/086* (2013.01); *B60T 13/38* (2013.01); *B60T 17/083* (2013.01); *B60T 17/088* (2013.01); *F16D 65/0043* (2013.01)

(58) Field of Classification Search
CPC .... B60T 17/086; B60T 17/083; B60T 17/088; B60T 13/38; F16D 65/28; F16D 65/0043

USPC ....................................................... 92/62–64
See application file for complete search history.

(56) References Cited

U.S. PATENT DOCUMENTS 3,117,496 A * 1/1964 Dobrikin ............... B60T 17/083
                                                 267/180
3,782,251 A * 1/1974 Le Marchand ....... B60T 17/083
                                                 92/130 A
4,364,305 A * 12/1982 Dalibout ............... B60T 17/083
                                                 188/170

(Continued)

FOREIGN PATENT DOCUMENTS

CN         103318157 A    9/2013
EP         0921331 A2     6/1999

*Primary Examiner* — Bradley T King
*Assistant Examiner* — James K Hsiao
(74) *Attorney, Agent, or Firm* — Leydig, Voit & Mayer, Ltd.

(57) ABSTRACT

A spring-type brake cylinder that includes a compression spring, a pressure chamber, a dividing wall disposed between the compression spring and the pressure chamber, a piston having an inner wall and a bottom, and a nut disposed inside the piston and configured to be held on a release bolt. A support structure is disposed inside the piston and configured to abut against the nut while the release bolt is screwed into the nut. The piston comprises a first retaining structure and a second retaining structure, the first retaining structure configured to hold the support structure in an assembly position and the second retaining structure configured to hold the support structure in a drive position. The support structure is moveable from the assembly position to the drive position by a movement of the nut relative to the piston.

17 Claims, 9 Drawing Sheets

(56) References Cited

U.S. PATENT DOCUMENTS

| | | | | |
|---|---|---|---|---|
| 5,632,192 | A | * | 5/1997 | Plantan ................ B60T 17/086 92/15 |
| 5,725,076 | A | * | 3/1998 | Pierce ................... B60T 17/086 188/170 |
| 6,119,826 | A | | 9/2000 | Niederstadt et al. |
| 8,944,527 | B2 | * | 2/2015 | Schrader ................ B60T 17/16 188/170 |
| 9,193,344 | B2 | * | 11/2015 | Shimomura .......... B60T 17/083 |
| 2014/0151162 | A1 | * | 6/2014 | Mathern ................ B61H 13/02 188/33 |
| 2014/0345987 | A1 | * | 11/2014 | Elstorpff ............... B60T 17/086 188/107 |
| 2015/0246667 | A1 | * | 9/2015 | Shimomura ............ F16D 65/28 188/166 |

* cited by examiner

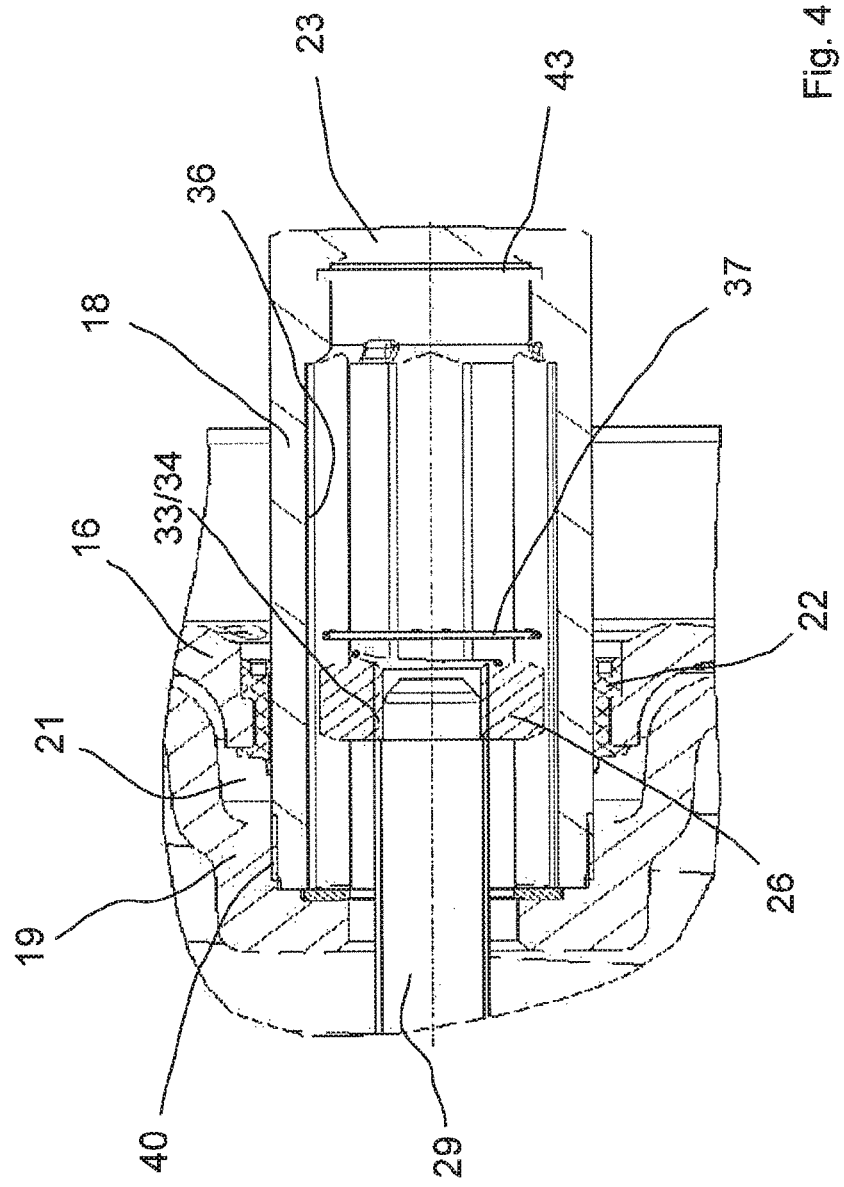

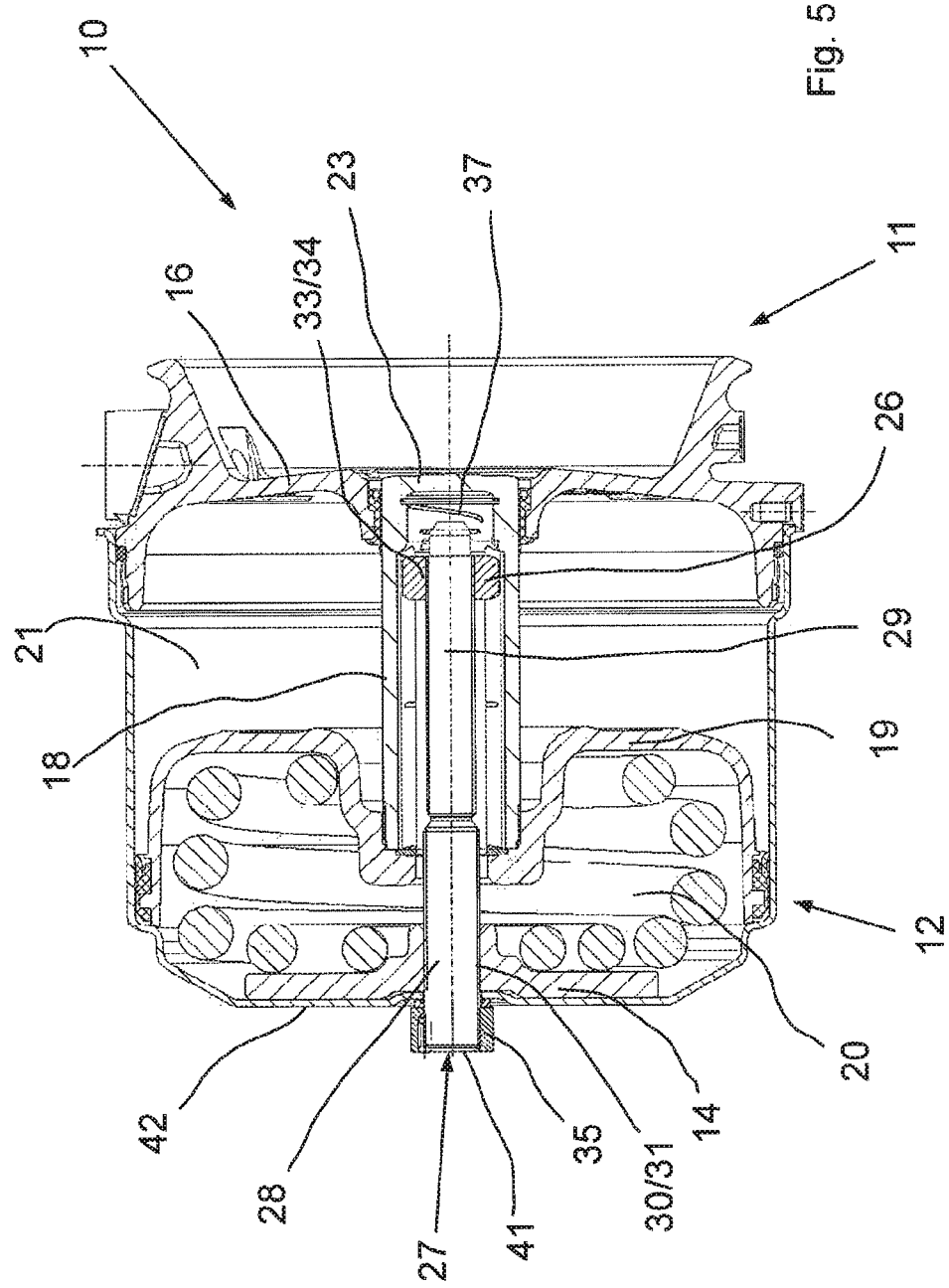

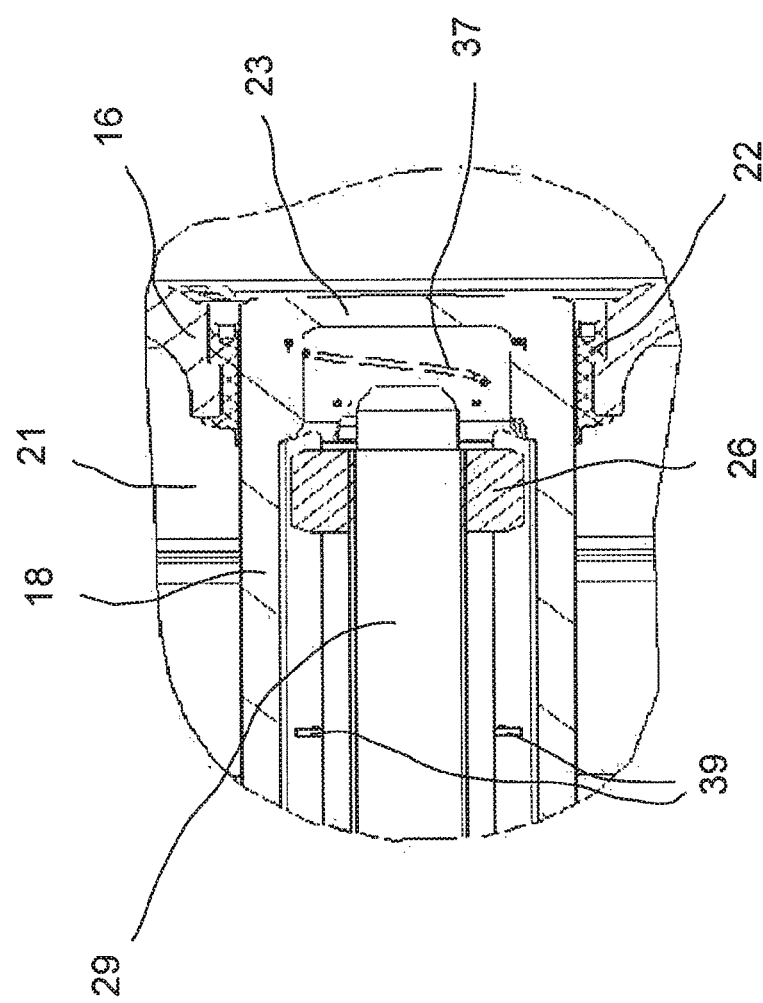

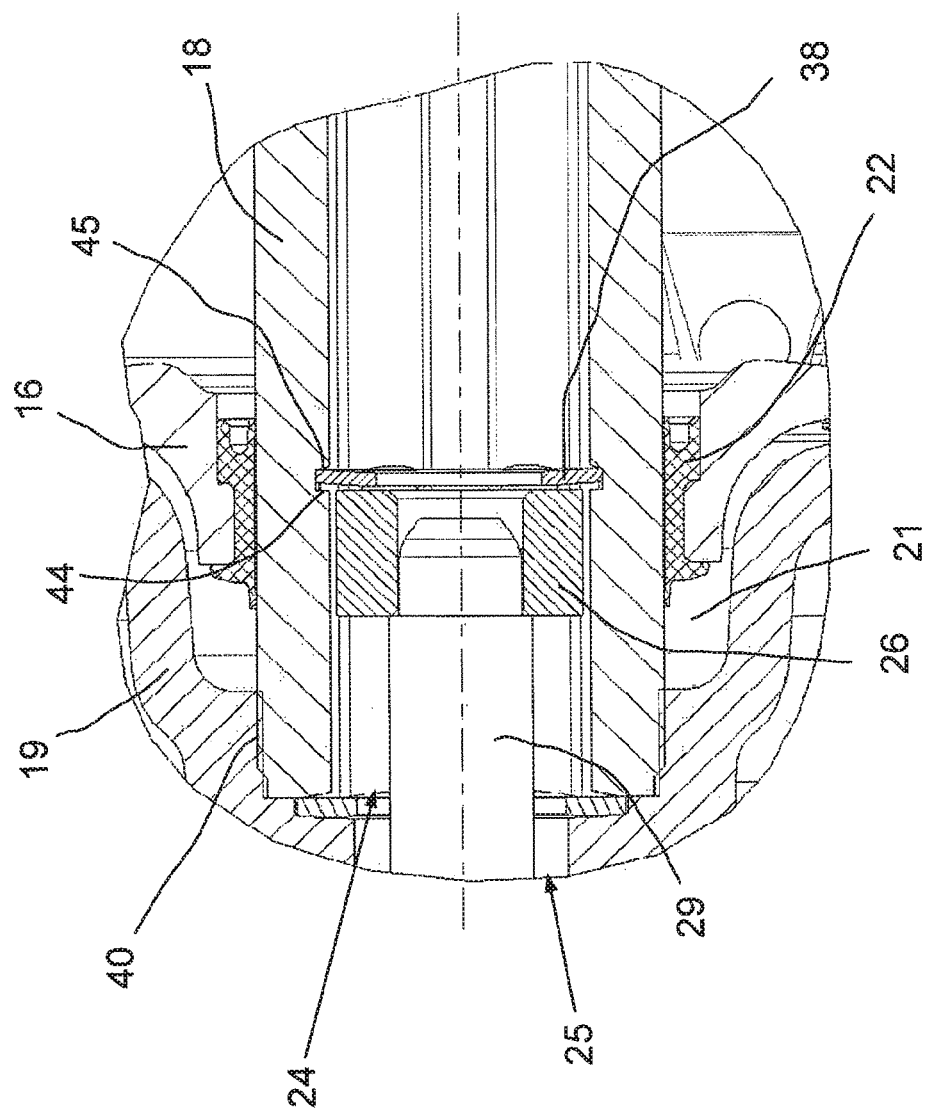

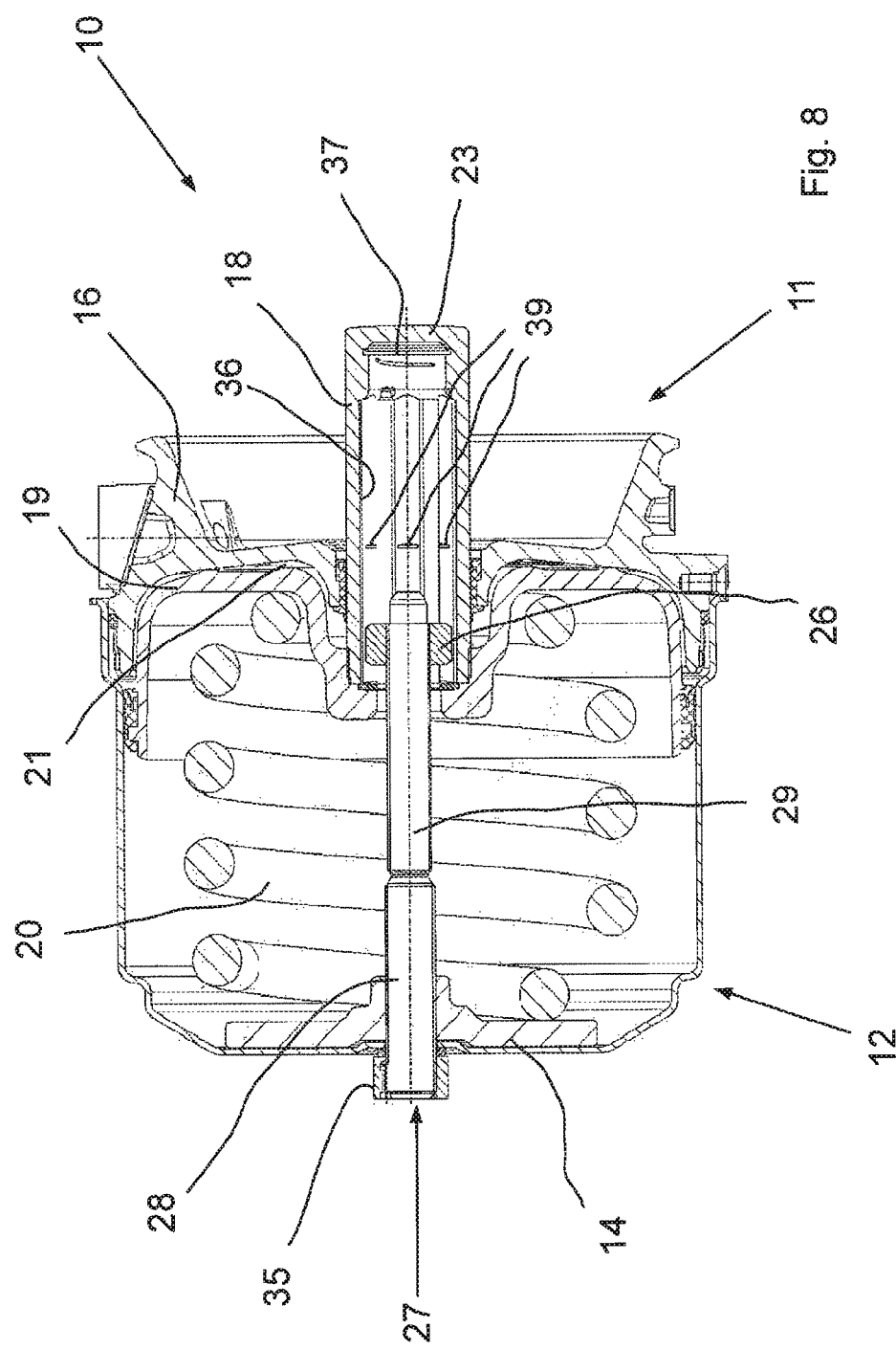

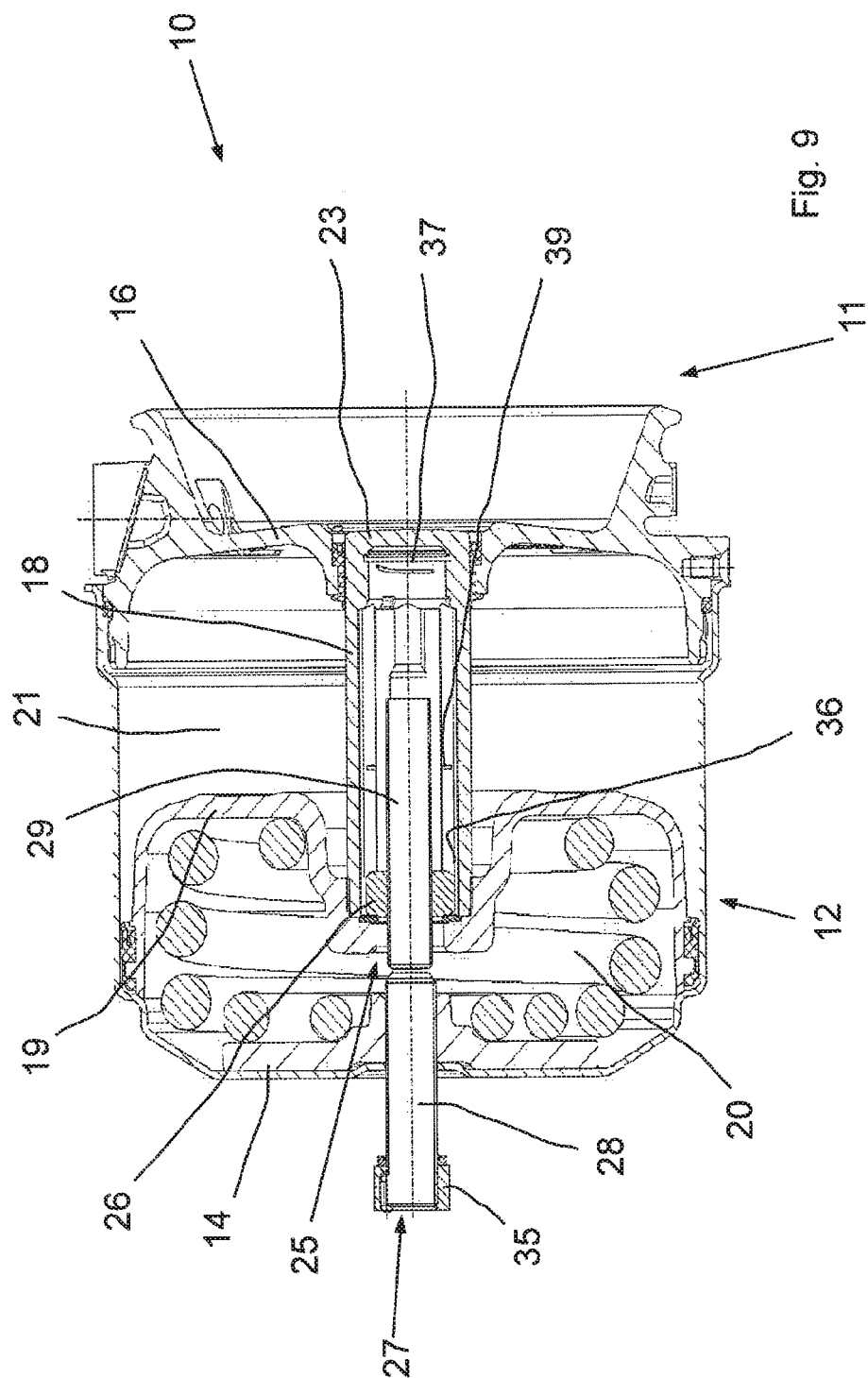

BRAKE CYLINDER

CROSS REFERENCE TO RELATED APPLICATIONS

This application is a U.S. National Stage Application under 35 U.S.C. § 371 of International Application No. PCT/EP2013/003875 filed on Dec. 19, 2013. The International Application was published in English on Jun. 25, 2015 as WO 2015/090344 A1 under PCT Article 21(2).

FIELD

The present invention relates to spring-type brake cylinders, particularly combined service and parking brake cylinders, especially to spring-type brake cylinders for pneumatic brakes for commercial vehicles. The invention further relates to brakes with a spring-type brake cylinder.

BACKGROUND

Pneumatic brakes for commercial vehicles are well-known, for example as disc brakes, drum brakes, wedge brakes, cam brakes or other type of brakes. In a pneumatic brake a housing of a brake cylinder is attached to a housing of a brake caliper and applies a brake actuation force through a cylinder plunger to a lever within the housing of caliper.

SUMMARY

In an embodiment, the present invention provides a spring-type brake cylinder that includes a compression spring, a pressure chamber having a wall with an opening therein, a dividing wall disposed between the compression spring and the pressure chamber, a piston having an inner wall and a bottom, the piston being disposed in the pressure chamber and operable to extend through the opening in the wall of the pressure chamber, and a nut disposed inside the piston and configured to be held on a release bolt. The piston includes a guide configured to guide the nut such that the nut cannot be rotated in the piston and such that the nut is moveable along a longitudinal direction of the piston. A support structure is disposed inside the piston and configured to abut against the nut while the release bolt is screwed into the nut. The piston comprises a first retaining structure and a second retaining structure, the first retaining structure configured to hold the support structure in an assembly position and the second retaining structure configured to hold the support structure in a drive position. The drive position is closer to the bottom than the assembly position. The support structure is moveable from the assembly position to the drive position by a movement of the nut relative to the piston.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 shows a detail of the longitudinal section of FIG. 3 in the assembly position, namely the piston and the nut with the release bolt and the helical spring as support structure for the nut;

FIG. 5 shows a longitudinal section of the combined brake cylinder of FIG. 3 in a driving position;

FIG. 6 shows a detail of the longitudinal section FIG. 5 in the driving position, including the piston and the nut with the release bolt and the spring as a support structure for the nut;

FIG. 7 shows a detail of a longitudinal section similar to that of FIG. 6 in an assembly position, including a piston and a nut with a release bolt and a spring disc as a support structure for the nut;

FIG. 8 shows a longitudinal section according to FIG. 5 in a position without pressure in a pressure chamber; and FIG. 9 shows a longitudinal section according to FIG. 8 in a mechanically released position with partly unscrewed release bolt.

DETAILED DESCRIPTION

Figure 1:
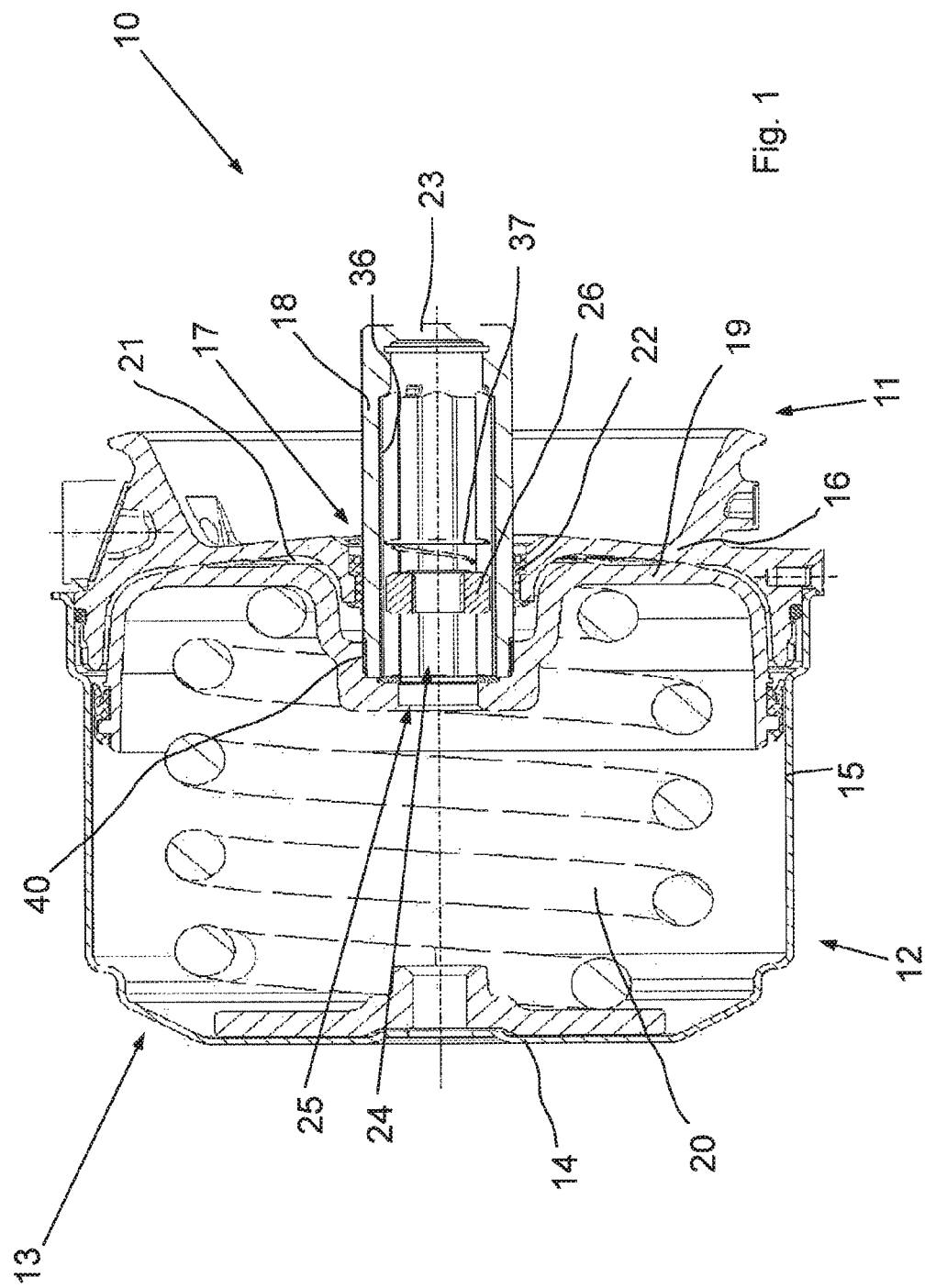
FIG. 1 shows a longitudinal section of one part of a combined brake cylinder according to an embodiment of the invention in an assembly position.
Figure 2:
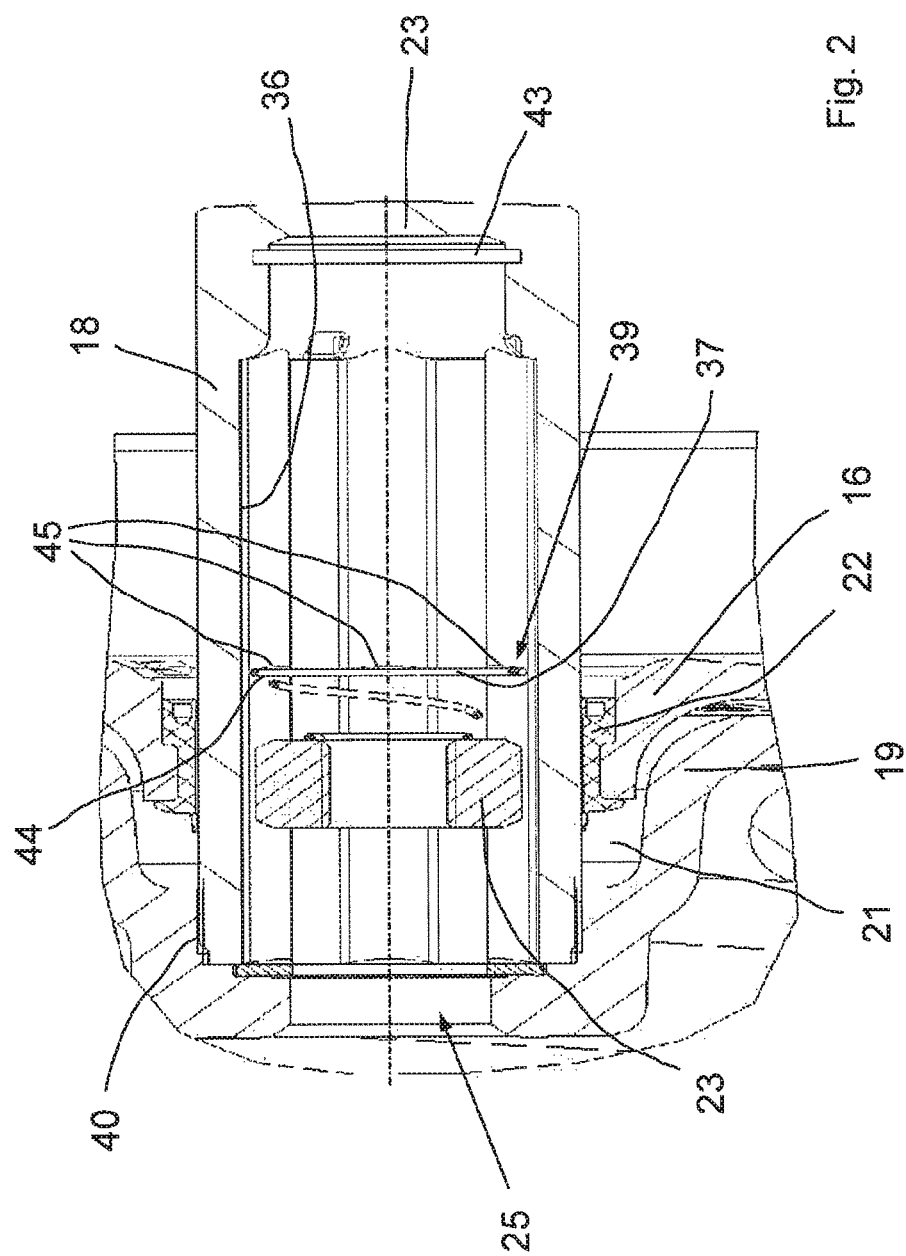
FIG. 2 shows a detail of the longitudinal section of FIG. 1 in an assembly position including a piston and nut for a release bolt and a helical spring as a support structure for the nut.
Figure 3:
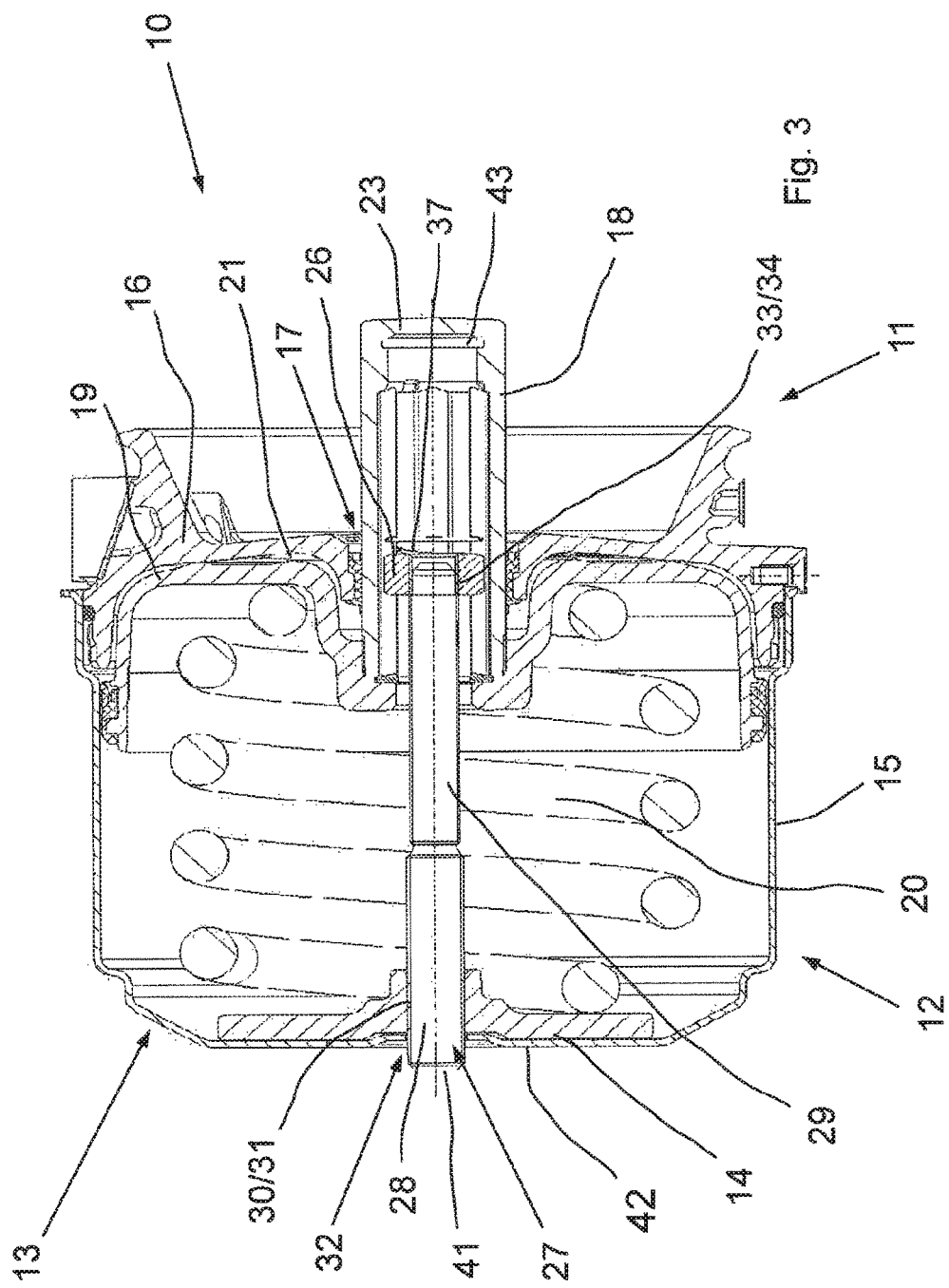
FIG. 3 shows a longitudinal section of the combined brake cylinder of FIG. 1 in an assembly position together with an inserted release bolt.

A spring-type brake cylinder is provided with a compression spring, a pressure chamber and a dividing wall between compression spring and pressure chamber, with a piston in the pressure chamber and an opening in a wall of the pressure chamber, the piston extending through the opening. The piston is hollow, connected to the dividing wall and has an outer wall, an inner wall and a bottom. Inside the piston a nut is held on a release bolt and the piston has a guide for guiding the nut, such that the nut cannot be rotate in the piston and the nut is moveable in longitudinal direction of the piston. The release bolt further extends through an opening in a head of the brake cylinder and through an opening in the dividing wall. Inside the piston is a support structure for butting against the nut while the release bolt is screwed into the nut. The support structure is only needed for the assembly of the brake cylinder. Once the brake cylinder has been completed, particularly when the brake cylinder is operating, it is desirable for the support structure to be inoperative and/or hidden. According to an embodiment of the invention, a brake cylinder is provided having a support structure that is inoperative and/or hidden when the brake cylinder is operating.

According to an embodiment, a piston has at least a first retaining structure and a second retaining structure, the first retaining structure holding the support structure in an assembly position, and the second retaining structure holding the support structure in a drive position. The drive position is closer to the bottom than the assembly position. The support structure is moveable from the assembly position to the drive position by a movement of a nut relative to the piston. In the drive position the second retaining structure holds the support structure safely.

In a first use of a brake cylinder according to an embodiment of the invention, a pressure chamber can be inflated with compressed air, and a dividing wall, together with the piston, will be moved toward the release bolt. A nut provided at the end of the release bolt will thereby push the support structure from the assembly position into the drive position close to the bottom of the piston or at the bottom. Once the pressure chamber has been deflated, the support structure is positioned away from the nut. The support structure does not affect the function of a compression spring that is acting against the dividing wall. Furthermore the piston can be relatively short since the support structure does not need much space in its drive position.

In an embodiment of the invention, the piston has on its inner wall a first cavity and at least part of the support structure is held in the assembly position in the first cavity. The first cavity can be a circumferential groove or a group of grooves. Such a cavity or a groove is easy to manufacture. The first cavity acts as the first retaining structure.

In an embodiment of the invention, a cavity, particularly a groove, is provided with a wall butting against the support structure, the wall is provided obliquely, namely with an obtuse angle between the oblique wall and the adjoining inner wall of piston. Part of the support structure is held in the cavity and between the walls of cavity. The oblique wall allows a move of the support structure into the drive position depending on the angle of the oblique wall and the force acting on the dividing wall by inflating the pressure chamber. The angle should be chosen such that the support structure still stays in the assembly position when the release bolt is pressed toward the nut while the bolt is screwed into the nut.

In an embodiment of the invention, the piston has on its inner wall a second cavity, at least part of the support structure is held in the drive position in the second cavity, and the second cavity is particularly a circumferential groove or a group of grooves. Again, such a cavity or groove is easy to manufacture. The second cavity acts as the second retaining structure and holds the support structure in the drive position safely.

In an embodiment of the invention, the drive position is at the bottom of the piston. Hence the length of the piston is fully utilized.

In an embodiment of the invention, the support structure is elastic and can be compressible. Forces acting on the support structure will not destroy the support structure suddenly and can be calculated carefully. An elastic support structure can be moved easily from the assembly position to the drive position.

In an embodiment of the invention, the support structure is plastically deformable. Deformation can help the support structure to leave the assembly position.

In an embodiment of the invention, the support structure is a helical spring, a compression spring, a conical spring, a disc, a spring disc, a ring, a snap ring or a washer spring.

Embodiments of the invention also include a brake with a brake cylinder as described herein.

A commercial vehicle has a service brake function and a parking brake function. A pneumatic brake system also needs a brake function in case of pressure loss, i.e. a pressureless brake or emergency brake. For example, a parking brake could be realized by the pressureless brake function.

A parking brake and a service brake can have separate actuators or one combined actuator. FIGS. 1 to 9 refer to a combined brake cylinder 10 as an actuator for a pneumatic brake according to various embodiments of the invention. The actuator can also be provided for a separate spring brake with a pressureless brake function. The brake cylinder 10 has a service brake part 11 and a parking brake part 12. The parking brake part 12 is on the left side and includes the pressureless brake function. The service brake part 11 is shown incomplete and on the right side of the Figures.

A housing 13 of the parking brake part 12 has a cup-shape with a bottom 14 and a circumferential side wall 15. A cover 16 of the housing 13 is also a bottom of the service brake part 11 and has an opening 17 for a piston 18. Piston 18 is acting as a plunger against a diaphragm (not shown) in the service brake part 11.

In the housing 13 is a cup-shaped dividing wall 19 moveable like a piston from the cover 16, see FIG. 1, to a position close to but still with a distance to the bottom 14, see FIGS. 5 and 9. The distance is needed for the volume of a strong helical compression spring, namely a power spring 20.

Between dividing wall 19 and cover 16 a pressure chamber 21 is defined, see FIG. 5,9. Position of dividing wall 19 depends on the pressure in the pressure chamber 21. The pressure acts against the force of the power spring 20.

The piston 18 is mounted on the dividing wall 19 and is moving together with the diving wall 19. A sealing 22 is in the opening 17 and fits with the piston 18. The piston 18 is hollow like a tube but with a closed bottom 23 and an open head 24. The bottom 23 is located in the service brake part 11. The dividing wall 19 has a central opening 25 coaxial and without a gap to the open head 24.

A nut 26 is positioned in the piston 18. The nut 26 is held torque proof but moveable in the longitudinal direction of the piston 18. The piston 18 has a hexagonal inner cross section as a guide for the moveable nut 26. The opening 25 is narrower than an outer cross section of the nut 26. As can be seen in FIGS. 3 to 9, a release bolt 27 can be screwed into the nut 26.

The release bolt 27 has two parts, a thicker part 28 on one hand and a thinner part 29 on the other hand with a length ratio of approximately 3 to 4 (thicker part to thinner part). An external screw thread 30 of the thicker part 28 corresponds to an internal screw thread 31 of a central bore 32 in the bottom 14 of the housing 13 and is screwed into it. An external screw thread 33 of the thinner part 29 corresponds to an internal screw thread 34 of the nut 26. Screw threads 30/31 are counter-rotating to screw threads 33/34. A nut 35 can be fixed on the end of thicker part 28, as can be seen in FIGS. 8, 9.

The function of the release bolt 27 can be shown with reference to FIGS. 5, 8, and 9. FIG. 5 shows the driving position of the brake cylinder 10. The pressure chamber 21 is inflated with compressed air. Hence the dividing wall 19 compresses the power spring 20 and the piston 18 extends along the pressure chamber 21. The release bolt 27 extends from the bottom 14 far into the piston 18, with the nut 35 on one end outside the bottom 14 and with the moveable nut 26 at the other end of the release bolt 27 inside the piston 18.

FIG. 8 shows a pressureless position of the brake cylinder 10. The pressure chamber 21 is deflated and the power spring 20 is expanded. The dividing wall 19 is moved close to the cover 16 and the piston 18 extends far into the service brake part 11. The parking brake is actuated (not shown).

A mechanically released position is shown in FIG. 9. The release bolt 27 is screwed out of the bottom 14 partially by turning the nut 35 fixed on the bolt 27. As a result and with respect to the counter-rotating screw threads the other nut 26 is moved along the thinner part 29 towards the opening 25 until the nut 26 is butting against edges of the opening 25 and is pushing the dividing wall 19 towards the bottom 14. The power spring 20 is compressed, the piston 18 is moved nearly out of the service brake part 11 into the parking brake part 12 and hence the parking brake has been released.

By assembling the brake cylinder 10 the release bolt 27 and the nut 26 have to bring together. For that reason the nut 26 is positioned in the piston 18 namely in an assembly position according to FIG. 1 and butting against a support structure. The support structure is hold at an inner wall 36 of the piston 18. In FIGS. 1 to 6 and 8, 9 the support structure is a conical (helical) compression spring 37, while another support structure is shown in FIG. 7, namely a spring disc 38. The nut 26 is positioned closer to the opening 25 than to the bottom 23 (of the piston 18) with approximately one quarter of the length of the piston 18 as a distance to the opening 25. The support structure is held in the piston by first retaining structure, namely grooves 39 closer to a middle (of length) of the piston 18 than the nut 26. The grooves 39 are provided inside the piston 18 along the hexagonal cross section and define a cross-sectional area or plane. The support structure must be placed in the piston 18 before the nut 26 can be moved into the piston 18 since the bottom 23 is closed.

In a next step, the piston 18 is fixed on the dividing wall 19, see screw threads 40. Afterwards the release bolt 27 is screwed into the bottom 14 until the thinner part 29 pushes against the nut 26 while the pressure chamber 21 is deflated. An end face 41 of the release bolt 27 nearly flushes with an outer face 42 of the bottom 14. Subsequently the release bolt 27 is screwed out of the bottom 14 for a few turns, and with respect to the counter-rotating screw threads the nut 26 is drawn up on the thinner part 29, see FIG. 3. The pressure chamber 21 is still deflated. The release bolt 27 is screwed out of the bottom 14 until the nut 35 can be fixed at the end of the thicker part 28. The nut 35 is butting against the bottom 14 and the nut 26 is drawn up on the thinner part 29 a little bit more compared to FIG. 3, see FIG. 8. FIG. 8 shows a position after the first actuation of the brake cylinder 10 and during lifetime as well.

By inflating the pressure chamber 21 for the first time the piston 18 is moved towards the bottom 14 and the nut 26 and/or the release bolt 27 pushes the support structure—the compression spring 37—from the first retaining structure into a second retaining structure at the bottom 23 of piston 18. The second retaining structure can be the same as the first retaining structure or a similar one. In this embodiment the second retaining structure is a circumferential groove 43 in the inner wall 36 of the piston 18 where the cross section of the piston is circular. Since the support structure are now held in the second retaining structure the nut 26 and the release bolt 27 can be moved in axial direction nearly totally without being under pressure of the support structure.

To allow the movement of the support structure from the first retaining structure to the second retaining structure, the grooves 39 are defined by walls 44 crosswise to the axial direction (and to the inner wall 36) on one hand and oblique walls 45 on the other hand so that the compression spring 37 can slide out of the grooves 39 under pressure of the release bolt 27 or the nut 26 and towards the bottom 23. Oblique walls 45 are closer to the bottom 23 than the crosswise walls 44. Between the oblique walls 45 and the adjoining inner wall 36 is provided an obtuse angle of particularly 100° to 135°. The groove 43 has only crosswise oriented walls to keep the compression spring 37 safely.

The axial length of the compression spring 37 can be very short since the grooves 39 and 43 are far away from each other. The shorter the spring 37 or any other support structure in axial direction is, the shorter the piston 18 and the brake cylinder 10 can be. A shorter brake cylinder 10 is always advantageous, has less volume, needs less volume around, is stiffer and has less vibrations.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF DESIGNATIONS

10 Combined brake cylinder
11 Service brake part
12 Parking brake part
13 Housing
14 Bottom (of housing)
15 Side wall
16 Cover
17 Opening
18 Piston
19 Dividing Wall
20 Power spring
21 Pressure chamber
22 Sealing
23 Bottom (of Piston)
24 Head
25 Opening
26 Nut (moveable)
27 Release bolt
28 Thicker part
29 Thinner part
30 External screw thread (of thicker part)
31 Internal screw thread (of bottom 14)
32 Central bore
33 External screw thread (of thinner part)
34 Internal screw thread (of nut 26)
35 Nut (fixed on release bolt)
36 Inner wall (of piston)
37 Compression spring
38 Spring disc
39 Grooves
40 Screw threads
41 End face
42 Outer face
43 Groove
44 Crosswise walls
45 Oblique walls

The invention claimed is:

1. A brake cylinder, comprising:
   a compression spring;
   a pressure chamber having a wall with an opening therein;
   a dividing wall disposed between the compression spring and the pressure chamber;
   a piston having an inner wall and a bottom, the piston being disposed in the pressure chamber and operable to extend through the opening in the wall of the pressure chamber; and
   a nut disposed inside the piston and configured to be held on a release bolt,
   wherein the piston includes a guide configured to guide the nut such that the nut cannot be rotated in the piston and such that the nut is moveable along a longitudinal direction of the piston,
   wherein a support structure is disposed inside the piston and configured to abut against the nut while the release bolt is screwed into the nut,
   wherein the piston comprises a first retaining structure and a second retaining structure, the first retaining structure configured to hold the support structure in an assembly position and the second retaining structure configured to hold the support structure in a drive position,
   wherein, from the assembly position, the drive position is located in a direction of the bottom of the piston, and
   wherein the support structure is moveable from the assembly position to the drive position by a movement of the nut relative to the piston.

2. The brake cylinder according to claim 1, wherein the inner wall of the piston includes a first cavity,
   wherein at least part of the support structure is configured to be held in the assembly position in the first cavity, and
   wherein the first cavity is a circumferential groove or a group of grooves.

3. The brake cylinder according to claim 2, wherein the cavity is provided with an oblique wall that abuts the support structure, and
   wherein an obtuse angle is formed between the oblique wall and the inner wall of the piston.

4. The brake cylinder according to claim 2, wherein each groove of the circumferential groove or group of grooves of the first cavity is defined by one or more crosswise walls that are crosswise to the inner wall of the piston and by one or more oblique walls that are disposed at an obtuse angle with respect to the inner wall of the piston.

5. The brake cylinder according to claim 4, wherein the obtuse angle is from 100 degrees to 135 degrees.

6. The brake cylinder according to claim 4, wherein the oblique walls are configured to allow the compression spring to slide out of each groove or group of grooves of the first cavity under pressure from one or more of the release bolt and the nut.

7. The brake cylinder according to claim 1, wherein the inner wall of the piston includes a second cavity,
   wherein at least part of the support structure is configured to be held in the drive position in the second cavity, and
   wherein the second cavity is a circumferential groove or a group of grooves.

8. The brake cylinder according to claim 1, wherein the drive position is at the bottom of the piston.

9. The brake cylinder according to claim 1, wherein the support structure is elastic.

10. The brake cylinder according to claim 9, wherein the support structure is compressible.

11. The brake cylinder according to claim 1, wherein the support structure is plastically deformable.

12. The brake cylinder according to claim 1, wherein the support structure is a helical spring, a compression spring, a conical spring, a disc, a spring disc, a ring, a snap ring, or a washer spring.

13. The brake cylinder according to claim 12, wherein the support structure is located in a direction of the bottom of the piston relative to the nut.

14. The brake cylinder according to claim 13, wherein the support structure is configured to abut against the nut while the release bolt is screwed into the nut by exerting a spring force on the nut in a direction opposite the bottom of the piston.

15. The brake cylinder according to claim 14, wherein the bottom of the piston is located at an end of the piston farthest from the opening in the wall of the pressure chamber.

16. The brake cylinder according to claim 12, wherein the support structure is a helical spring, a compression spring, a conical spring, a disc, a spring disc, a ring, a snap ring, or a washer spring.

17. A brake comprising:
    a brake cylinder comprising:
    a compression spring;
    a pressure chamber having a wall with an opening therein;
    a dividing wall disposed between the compression spring and the pressure chamber;
    a piston having an inner wall and a bottom, the piston being disposed in the pressure chamber and operable to extend through the opening in the wall of the pressure chamber; and
    a nut disposed inside the piston and configured to be held on a release bolt,
    wherein the piston includes a guide configured to guide the nut such that the nut cannot be rotated in the piston and such that the nut is moveable along a longitudinal direction of the piston,
    wherein a support structure is disposed inside the piston and configured to abut against the nut while the release bolt is screwed into the nut,
    wherein the piston comprises a first retaining structure and a second retaining structure, the first retaining structure configured to hold the support structure in an assembly position and the second retaining structure configured to hold the support structure in a drive position,
    wherein, from the assembly position, the drive position is located in a direction of the bottom of the piston, and
    wherein the support structure is moveable from the assembly position to the drive position by a movement of the nut relative to the piston.

* * * * *